July 8, 1941.  G. I. GOODWIN  2,248,228
CLUTCH PLATE
Filed Nov. 17, 1939   2 Sheets-Sheet 2
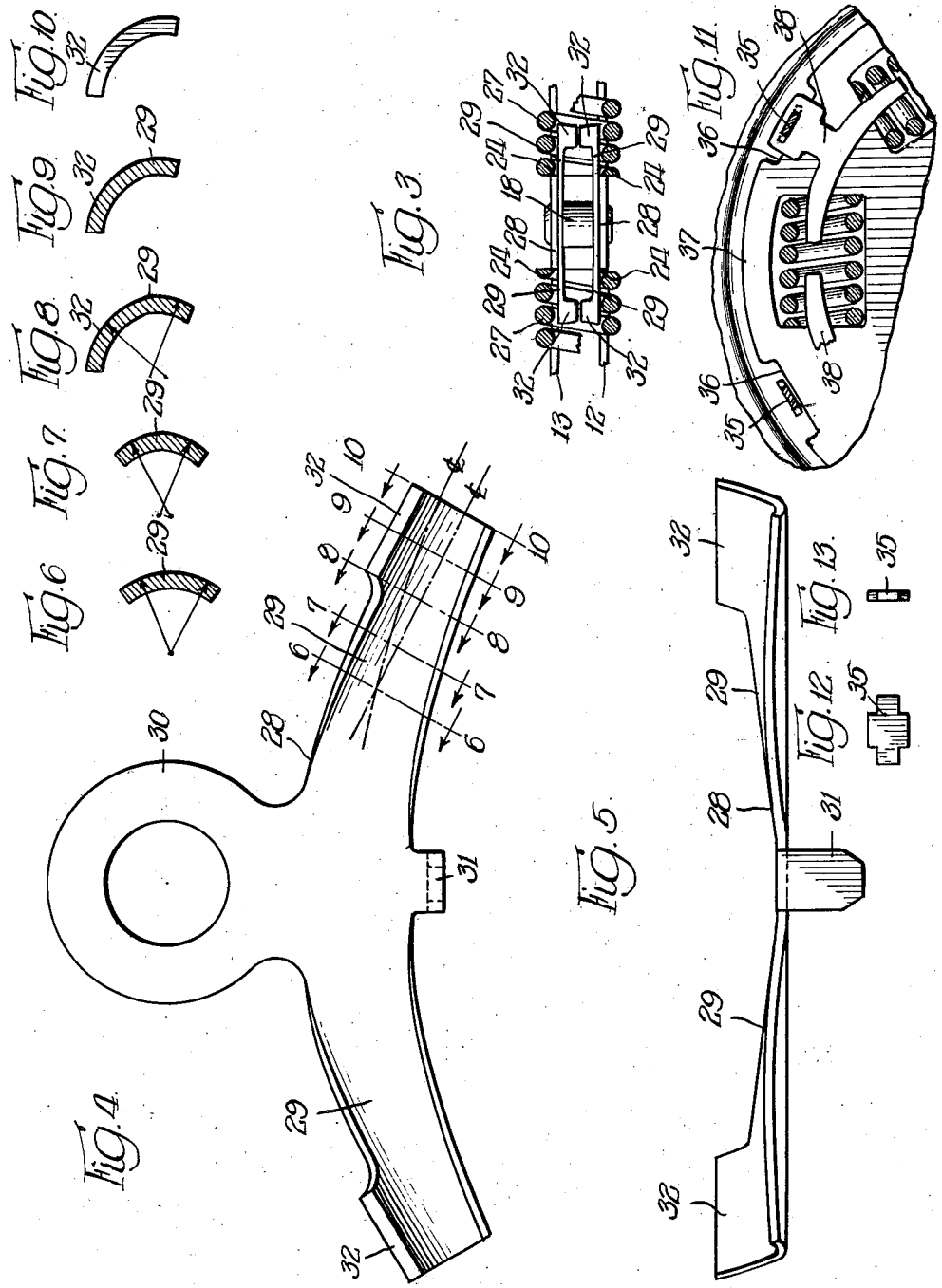
INVENTOR.
George I. Goodwin,
BY
Cromwell, Greist & Warden
ATTORNEYS Patented July 8, 1941

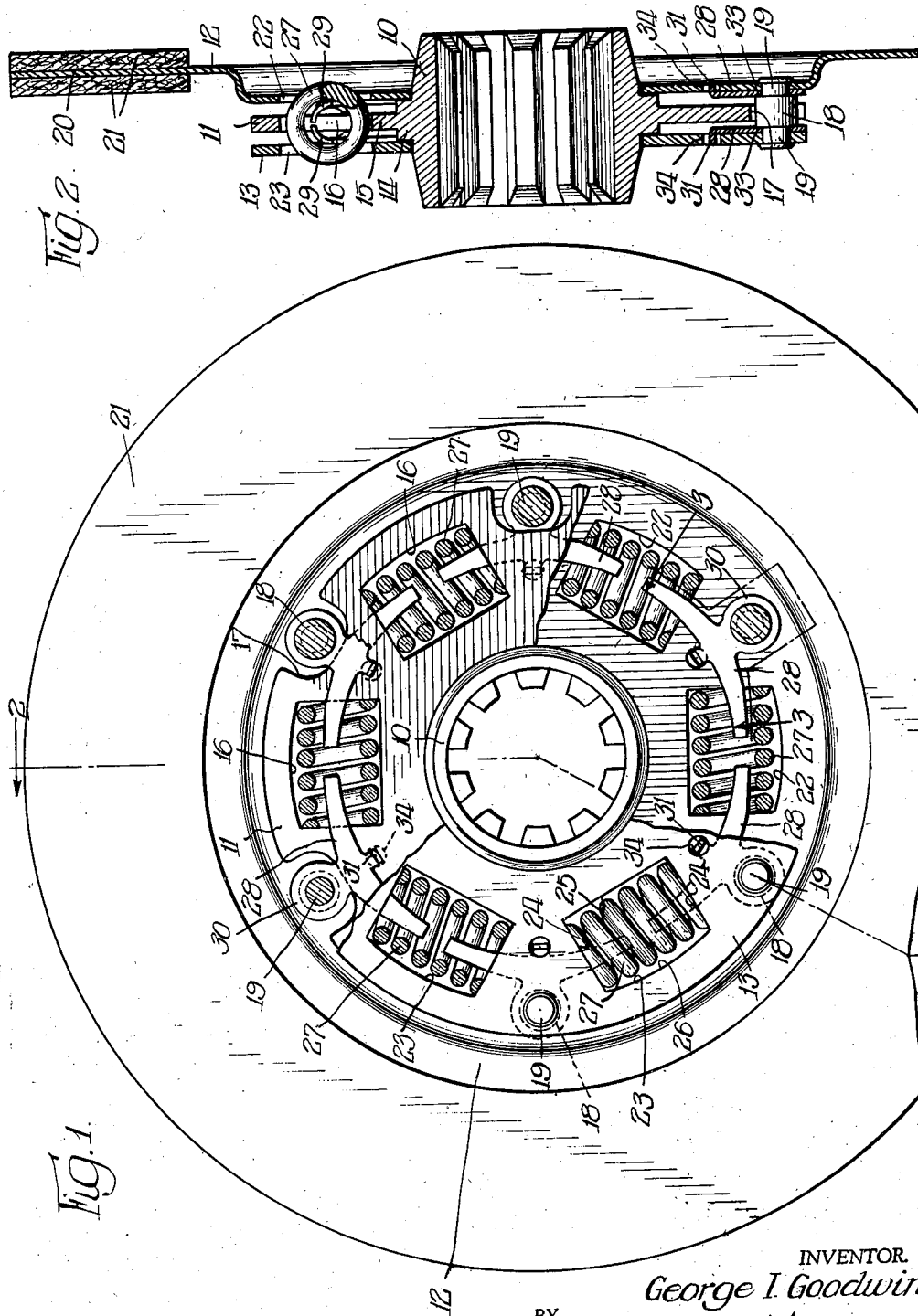

2,248,228

UNITED STATES PATENT OFFICE 2,248,228

CLUTCH PLATE

George I. Goodwin, Detroit, Mich.

Application November 17, 1939, Serial No. 304,937

10 Claims. (Cl. 192—68)

The present invention relates to clutch plates of the spring center type, in which the outer portion of the plate is capable of turning through a small arc with respect to the inner portion against the yielding resistance offered by a number of small helical coil springs.

The purpose of the invention is to provide, in a clutch plate of this type, improved means for supporting the springs, which means will keep the springs in proper position at all times, will not interfere in any way with the normal turning movement of the outer portion of the clutch plate with respect to the inner portion, and is strong, simple, inexpensive to manufacture and easy to assemble.

Other more specific objects and advantages will be apparent to those skilled in the art upon a full understanding of the construction, arrangement and operation of the improved spring supporting means.

A preferred embodiment of the invention is presented herein for the purpose of exemplification, together with one modification, but it will of course be appreciated that the invention is capable of being incorporated in various other structurally modified forms coming equally within the scope of the appended claims.

In the accompanying drawings:

Fig. 1 is a face view of a clutch plate equipped with the new spring supporting means of the invention, with certain of the parts broken away progressively about the circumference of the plate to reveal the construction and arrangement of the otherwise concealed parts;

Fig. 2 is a section through the plate, taken on the irregular line 2—2 of Fig. 1;

Fig. 3 is a fragmentary section, taken on the irregular line 3—3 of Fig. 1;

Fig. 4 is a greatly enlarged face view of one of the retainers used in supporting the springs;

Fig. 5 is an inner edge view of the retainer;

Figs. 6, 7, 8, 9 and 10 are transverse sections through one of the legs of the retainer, taken respectively on the lines 6—6, 7—7, 8—8, 9—9 and 10—10 of Fig. 4;

Fig. 11 is a fragmentary view which corresponds to a portion of Fig. 1 but shows a modified form of the invention;

Fig. 12 is a side view of one of the flat rivets used in this modified structure; and Fig. 13 is an end view of the same rivet.

The clutch plate shown in the drawings includes a hub 10 which is provided with a radial flange 11, a centrally apertured friction disk 12, and a centrally apertured side plate 13. The hub 10 is interiorly splined for non-rotatable engagement with a correspondingly splined shaft, on which it is adapted to be mounted. The flange 11 of the hub is characterized by a relatively thick inner portion 14 and a relatively thin outer portion 15. The thin outer portion 15 of the flange is provided with a number of circumferentially spaced spring openings 16, and is also provided with notches 17 in its outer periphery between and outwardly of the openings 16.

The friction disk 12 and the side plate 13 are both rotatably mounted on the hub 10 at opposite sides of the flange 11, in engagement with the thick inner portion 14 of the flange, and are rigidly coupled together by rivets 18 which pass through the notches 17 in the flange. The rivets 18 hold the disk 12 and side plate 13 in rigid, non-rotatable, definitely spaced association with each other, and are provided with reduced end portions 19 which extend into holes in the disk and side plate. The spacing of the disk 12 and side plate 13 effected by the rivets 18 is preferably a little in excess of the thickness of the inner portion 14 of the flange 11, and the center apertures in the disk 12 and side plate 13 are also preferably somewhat larger than the portions of the hub on which they are journaled, whereby to allow for a slight universal movement of the disk and side plate as a unit relative to the hub, which movement will permit automatic adjustment to compensate for any minor misalignment between the splined shaft and the friction face of the fly wheel. The notches 17 are of somewhat greater width than the diameter of the rivets 18, and limit in both directions the extent to which the disk 12 and side plate 13 can turn with respect to the flange 11 of the hub, while at the same time allowing some movement. The rivets 18 are preferably of circular cross-section but may of course be of non-circular cross-section. The outer portion 20 of the disk 12 is provided with suitable friction facings 21 which may be fastened in position in any desired manner. This outer portion 20 is shown as an integral part of the disk 12, but it may be made as a separate part, or even as a number of separate parts, without in any way affecting the present invention.

The disk 12 and side plate 13 are provided respectively with a number of spring openings 22 and 23, which openings register with each other and with the openings 16 in the flange 11. The openings 16, 22 and 23 are of the same shape and size, being of generally rectangular elongated form, with parallel ends 24, straight inner edge 25, and curved outer edges 26.

Helical coil springs 27 are positioned, preferably under some compression, in each set of registering openings 16, 22 and 23, with their ends against the ends 24 of the openings. These springs yieldingly resist rotary movement of the disk 12 and side plate 13 relative to the flange 11 of the hub. The springs 27 are held in position by retainers 28, which retainers are arranged in pairs and extend into the ends of adjacent springs. The retainers 28 are preferably sheet metal stampings of generally arcuate form.

Each of the retainers 28 is provided with two arms 29 which extend circumferentially in opposite directions into the ends of adjacent springs, a centrally apertured ear 30 on the outer side of the retainer at the center of the same between the arms 29, and a small laterally bent tongue 31 on the inner side of the retainer directly opposite the ear 30.

The inner portions of the arms 29 are curved longitudinally, as shown in Figs. 1 and 4, and the inner and outer portions of the arms are curved transversely, as shown in Figs. 6 to 10 inclusive. The arms taper toward their ends, and are provided near their ends in their outer portions with wing-like extensions 32. The inner portions of the arms are curved about the center of the clutch plate assembly, with the result that during the arcuate movement of the ends of the springs under compression the inner portions of the arms will be uniformly spaced at all times from the inside surfaces of the ends of the springs. This shaping of the inner portions will prevent any rubbing or binding against the springs during compression of the latter, while at the same time affording adequate support for the springs. The outer portions of the arms are not curved longitudinally about the same center as the inner portions but extend into the ends of the springs in substantially parallel relation to the inner surfaces of the springs in the uncompressed condition of the latter, thereby giving to the arms the tapered shape above referred to. The transverse curvature of the inner and outer portions of the arms takes place about centers which are located on different lines, which lines coincide near the bases of the arms but separate gradually from each other toward the ends, as indicated by the radius lines in Figs. 6, 7 and 8 and the center lines in Fig. 4. This affords maximum support for the inside surfaces of the ends of the springs when the same are compressed as well as extended, the special shaping of the arms keeping the latter from interfering in any way with the movement of the springs while at the same time affording uniformly spaced supporting means for the inner portions of the inside surfaces of the ends of the springs in all positions of the latter.

The apertured ears 30 of the retainers 28 are mounted on the reduced end portions 19 of the rivets 18, against shoulders 33 resulting from the reduction of the end portions, preferably in pressed fit association with the end portions 19, and are clamped rigidly in position by the confronting faces of the disk 12 and side plate 13. By press fitting the retainers on each rivet the same may be made into a sub-assembly and inserted between the disk and side plate as a single piece, thereby facilitating the main assembly. The retainers 28 are locked against dislodgment by the laterally bent tongues 31 on the same, which tongues project into apertures 34 provided for that purpose in adjacent portions of the disk and side plate. The retainers 28 in each pair are shown as separate members, but to facilitate assembly the same might be connected together, either across the ears 30 or across the extensions 32. The extensions 32 are preferably disposed in proximity to each other (see Fig. 3) in order to enable either of the retainers to act as a reinforcement for the other should any force be exerted against the latter tending to laterally deform the same.

In the modification shown in Figs. 11, 12 and 13, flat rivets 35 are used in place of round rivets. These flat rivets permit the notches 36 in the flange 37 of the hub to be made quite shallow, thereby increasing the strength of the flange 37 without materially affecting the rigidity of the connection between the disk and the side plate. The flat rivets 35 also positively lock the retainers against any turning movement, thereby eliminating any need for anchoring tongues on the retainers.

I claim:

1. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate, said disk and side plate being provided with spring openings in register with the spring openings in the flange, axially compressible spring members positioned in the openings in engagement with the ends of the latter for yieldingly resisting rotary movement of the disk and side plate relative to the flange, and retainers for the spring means mounted on the separators with terminal portions of the retainers extending into guiding association with the spring means.

2. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate, said disk and side plate being provided with spring openings in register with the spring openings in the flange, helical coil springs positioned in the openings in engagement with the ends of the latter for yieldingly resisting rotary movement of the disk and side plate relative to the flange, and retainers for the springs mounted on the separators with terminal portions of the retainers extending into the ends of the springs.

3. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate at points intermediate the spring openings in the flange, said disk and side plate being provided with spring openings in register with the spring openings in the flange, helical coil springs positioned in the openings in engagement with the ends of the latter for yieldingly resisting rotary movement of the disk and side plate relative to the flange, and retainers for the springs mounted on the separators between the disk and side plate with portions of the retainers extending into the ends of the springs.

4. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate at points intermediate the spring openings in the flange, said disk and side plate being provided with spring openings in register with the spring openings in the flange, helical coil springs positioned in the openings in engagement with the ends of the latter for yieldingly resisting rotary movement of the disk and side plate relative to the flange, and one-piece sheet metal retainers for the springs mounted in pairs on the separators with oppositely projecting terminal portions of the retainers in each pair extending into the ends of adjacent springs.

5. In a clutch plate of the spring center type, a hub having a radial flange provided with circumferentially spaced spring openings and notches in the outer periphery of the flange intermediate the openings, a centrally apertured friction disk rotatably mounted on the hub at one side of the flange, a side plate rotatably mounted on the hub at the other side of the flange, circumferentially spaced separators rigidly connecting the disk and side plate through the notches in the flange, said separators coacting with the sides of the notches to limit rotary movement of the disk and side plate relative to the flange, and said disk and side plate being provided with spring openings in register with the spring openings in the flange, helical coil springs positioned in the openings in engagement with the ends of the latter for yieldingly resisting rotary movement of the disk and side plate relative to the flange, and one-piece sheet metal retainers for the springs mounted in pairs on the separators with oppositely projecting terminal portions of the retainers in each pair extending into the ends of adjacent springs.

6. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate at points intermediate the spring openings in the flange, said disk and side plate being provided with spring openings in register with the spring openings in the flange, helical coil springs positioned in the openings in engagement with the ends of the latter for yieldingly resisting rotary movement of the disk and side plate relative to the flange, and retainers for the springs mounted in pairs on the separators with oppositely projecting portions of the retainers in each pair extending into the ends of adjacent springs, the retainers in each pair having the oppositely projecting portions thereof turned laterally into the spring openings in the flange of the hub into positions adjacent each other, whereby to reinforce each other against displacement in a direction parallel to the axis of the hub.

7. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate at points intermediate the spring openings in the flange, said disk and side plate being provided with spring openings in register with the spring openings in the flange, helical coil springs positioned in the openings in engagement with the ends of the latter for yieldingly resisting rotary movement of the disk and side plate relative to the flange, and retainers for the springs mounted on the separators between the disk and side plate with portions of the retainers extending into the ends of the springs, said retainers having angularly bent tongues disposed within recesses in the disk and side plate, whereby to locate the retainers correctly with respect to the openings in the ends of the springs.

8. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate, said disk and side plate being provided with spring openings in register with the spring openings in the flange, helical coil springs positioned in the openings in engagement with the ends of the latter for yieldingly resisting rotary movement of the disk and side plate relative to the flange, and one-piece sheet metal retainers for the springs mounted on the separators with terminal portions of the retainers extending into the ends of the springs, said retainers being so constructed and arranged as to conform in shape to the path of motion followed by the outer sides of the openings in the ends of the springs during compression, whereby to maintain relatively close and uniform clearances between the retainers and the springs in all positions of the latter.

9. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate, said disk and side plate being provided with spring openings in register with the spring openings in the flange, helical coil springs positioned in the openings in engagement with the ends of the latter for yieldingly resisting rotary movement of the disk and side plate relative to the flange, and retainers for the springs mounted on the separators with terminal portions of the retainers extending into the ends of the springs, said terminal portions being tapered toward their ends.

10. In a clutch plate of the spring center type, a hub having a radial flange provided with circumferentially spaced spring openings, a centrally apertured friction disk rotatably mounted on the hub at one side of the flange, a side plate rotatably mounted on the hub at the other side of the flange, circumferentially spaced separators rigidly connecting the disk and side plate, said disk and side plate being provided with spring openings in register with the spring openings in the flange, helical coil springs positioned in the openings in engagement with the ends of the latter for yieldingly resisting rotary movement of the disk and side plate relative to the flange, and retainers for the springs mounted on the separators with terminal portions of the retainers extending into the ends of the springs, said terminal portions being tapered toward their ends and being provided with wing-like side extensions which follow the shapes of the outer sides of the openings in the ends of the springs during compression.

GEORGE I. GOODWIN.